United States Patent
Chaudhari et al.

(10) Patent No.: US 11,807,566 B2
(45) Date of Patent: Nov. 7, 2023

(54) MANUFACTURE OF POROUS GLASS AND GLASS-CERAMIC PARTICULATE STRUCTURES BY GEL CASTING

(71) Applicant: SYNTHERA BIOMEDICAL PRIVATE LIMITED, Pune (IN)

(72) Inventors: Amol Vasudeo Chaudhari, Pune (IN); Nilay Jayant Lakhkar, Pune (IN)

(73) Assignee: SYNTHERA BIOMEDICAL PRIVATE LIMITED, Pune (IN)

( * ) Notice: Subject to any disclaimer, the term of this patent is extended or adjusted under 35 U.S.C. 154(b) by 1139 days.

(21) Appl. No.: 16/464,183

(22) PCT Filed: Mar. 16, 2018

(86) PCT No.: PCT/IB2018/051766
§ 371 (c)(1),
(2) Date: May 24, 2019

(87) PCT Pub. No.: WO2018/167724
PCT Pub. Date: Sep. 20, 2018

(65) Prior Publication Data
US 2021/0147276 A1 May 20, 2021

(30) Foreign Application Priority Data
Mar. 16, 2017 (IN) .............................. 201721009050

(51) Int. Cl.
*C03B 19/09* (2006.01)
*C03C 4/00* (2006.01)
(Continued)

(52) U.S. Cl.
CPC ........... *C03B 19/09* (2013.01); *B01J 31/0237* (2013.01); *C03B 19/08* (2013.01);
(Continued)

(58) Field of Classification Search
CPC ..... C03C 4/0007–0014; C03C 11/0007; C03C 2203/20–36; C04B 35/624
See application file for complete search history.

(56) References Cited

U.S. PATENT DOCUMENTS

6,454,972 B1 * 9/2002 Morisette ................ C04B 35/63
  264/236
6,709,744 B1 * 3/2004 Day .......................... C03C 3/19
  428/407

(Continued)

FOREIGN PATENT DOCUMENTS

EP 2 386 525 A1 11/2011
KR 100785652 B1 * 12/2007

OTHER PUBLICATIONS

Translation of KR 10-0785652 B1 (Park) Dec. 14, 2007. Retrieved from: Clarivate Analytics database, 2022. (Year: 2007).*

(Continued)

*Primary Examiner* — Erin Snelting
(74) *Attorney, Agent, or Firm* — Kramer & Amado, P.C.

(57) ABSTRACT

The invention discloses porous, bioactive glass and glass ceramic morsels or pellets to be used as tissue graft substitute materials and processes for obtaining the same wherein the bioactive glass and glass ceramic morsels or pellets are made up of natural agents like phosphate, calcium, sodium and other elements which are not alien to the human or animal body. The said preparation process encompasses various steps like quenching sintering, foaming, and sol-gel casting which render the glass morsels or pellets unique bioactivity and enhanced porosity which may facilitate tissue repair and augmentation during tissue graft replacement.

15 Claims, 7 Drawing Sheets

(51) Int. Cl.
*C03C 11/00* (2006.01)
*C03C 3/16* (2006.01)
*B01J 31/02* (2006.01)
*C03B 19/08* (2006.01)
*C03B 19/10* (2006.01)
*C03B 19/12* (2006.01)
*C03B 37/01* (2006.01)
*C03B 37/016* (2006.01)
*C03C 3/21* (2006.01)
*C03C 1/00* (2006.01)

(52) U.S. Cl.
CPC ...... *C03B 19/1045* (2013.01); *C03B 19/1065* (2013.01); *C03B 19/12* (2013.01); *C03B 37/011* (2013.01); *C03B 37/016* (2013.01); *C03C 1/006* (2013.01); *C03C 3/21* (2013.01); *C03C 4/0014* (2013.01); *C03C 11/007* (2013.01); *C03C 2203/10* (2013.01); *C03C 2203/20* (2013.01); *C03C 2203/36* (2013.01); *C03C 2203/52* (2013.01)

(56) References Cited

U.S. PATENT DOCUMENTS

| | | | | |
|---|---|---|---|---|
| 2003/0212154 | A1* | 11/2003 | Johnson | C04B 35/624 521/50 |
| 2011/0142902 | A1* | 6/2011 | Jell | A61L 27/10 424/57 |
| 2011/0144765 | A1* | 6/2011 | Jones | A61P 17/02 623/23.61 |

OTHER PUBLICATIONS

Wu et al. Melt-derived bioactive glass scaffolds produced by a gel-cast foaming technique. Acta Biomaterialia 7 (2011) 1807-1816. (Year: 2011).*

Kasuga, et al., "Bioactive Ceramics prepared by sintering and crystallization of calcium phosphate invert glasses", Biomaterials 20 (1999) 1415-1420.

Kiani, et al., "Physical properties and MAS-NMR studies of titanium phosphate-based glasses", Materials Chemistry and Physics 120 (2010) 68-74.

Lakhkar, et al., "Titanium phosphate glass microspheres for bone tissue engineering", Acta Biomaterialia 8 (2012) 4181-4190.

Navarro, et al., "Physicochemical Degradation of Titania-Stabilized Soluble Phosphate Glasses for Medical Applications", J. Am. Ceram. Soc. 6 (8) 1345-52 (2003).

Neel, et al., "Effect of increasing titanium dioxide content on bulk and surface properties of phosphate-based glasses", Acta Biomaterialia 4 (2008) 523-524.

Neel, et al., "In vitro bioactivity and gene expression by cells cultured on titanium dioxide doped phosphate-based glasses", ScienceDirect, Biomaterials28 (2007) 2967-2997.

Sanzana, et al., "Of the in vivo behavior of calcium phosphate cements and glasses as bone substitutes", Acta Biomaterialia 4 (2008) 1924-1933.

Wang, et al., "Macroporous calcium phosphate glass-ceramic prepared by two-step pressing techniquie and using sucrose as a pore former", Journal of Materials Science: Materials in Medicine 16 (2005) 739-744.

* cited by examiner

200 – 400 μm    400 – 800 μm

MANUFACTURE OF POROUS GLASS AND GLASS-CERAMIC PARTICULATE STRUCTURES BY GEL CASTING

CROSS-REFERENCE TO RELATED APPLICATIONS AND PRIORITY

The present application claims priority from provisional patent application no. 201721009050 filed on the 16th day of Mar. 2017.

TECHNICAL FIELD

The present invention pertains to medicine, biotechnology and bioengineering, notably to manufacturing methods of materials for tissue augmentation and regeneration. The invention specifically relates to sterile, porous, bioactive and biocompatible material comprising porous, bioactive glass particles and processes thereof.

BACKGROUND

Bone is the second most implanted tissue or biological material in humans after blood. The source of human bone graft material is primarily limited to the patient's own skeleton (autogenous) or a limited supply of donated bones of human origin (allogenous) maintained in bone banks. Bone graft material is also produced from non-human sources such as bovine and porcine bone tissue (xenograft). An allograft or xenograft is a biologic scaffold, which is a mammalian extracellular matrix (ECM) composed of laminin, fibronectin, elastin, and collagen. An allograft is tissue transplanted between genetically nonidentical individuals of the same species. A xenograft is tissue transferred from one species to another species. Key differences between allografts and xenografts are tissue source, species of origin, and methods of processing. Autografts, allografts and xenografts suffer many disadvantages. In the case of autografts, it becomes necessary to perform an additional surgery for harvesting of the patient's bone, which adds to the overall treatment cost. Furthermore, the loss of bone from the harvesting site (often the iliac crest) is associated with long-term morbidity and pain at the harvest site. In addition, it may not be possible to harvest sufficient quantity of healthy bone in case of patients who present with degenerative conditions such as osteoarthritis. Allografts suffer from a major limitation which is that of large scale availability, in addition to risks with disease transmission arising from improper processing of donor bone tissue. In the case of xenografts, the tissue source is usually animals like the pig which have shorter lifespan and thus the transplanted tissue ages faster than other human tissue. Further, there is a possibility of transmission of diseases (xoonosis) such as bovine spongiform encephalopathy or porcine endogenous retroviruses since the transplant is carried out by suppressing the immune response mechanism. An ideal synthetic bone graft material would be resorbable i.e. it will be gradually broken down and replaced with new natural bone continuously through normal bone regeneration and remodelling. The material should be porous and osteoconductive to be populated by bone cells. The physical properties of the synthetic bone graft material should be compatible with natural bone to provide mechanical support while participating in the proper transmission of local stress required by the endogenous control mechanism of bone remodelling and bone growth.

In dental and medical practice, several different ceramic and glass materials are used for bone graft and other prosthetic applications. These mainly contain calcium and phosphorus, the elements present in the mineralized tissue of bone and teeth, as well as easy to use inert materials like silicon. However, these prosthetics suffer from various shortcomings.

In the present state of art, calcium sulphate or plaster of Paris ($CaSO_4 \cdot 2H_2O$) powder is a traditionally popular filling for bony defects, which is used by mixing with water and placed in bony defects, thereupon hardening. However, its role in stimulating bone to heal normally and its in vivo resorption rate are highly unpredictable.

In the present state of art, another hitherto popular substitute has been bovine bone with the organic components removed to leave the calcium phosphate mineral powder, essentially an apatite, $Ca_5(PO_4,CO_3)_3(OH)$, which is applied like a paste mixed with water. However, it suffers from a disadvantage that the particles can migrate and wash out from the implant site. Furthermore, the risk of disease transmission arising from improper processing of such bone cannot be ruled out.

In the present state of art, synthetic bone substitute materials are typically made from hydroxyapatite or a combination of hydroxyapatite and tricalcium phosphate ($Ca_3(PO_4)_2$). However, the material has a low melting point and hence cannot be processed by sintering at high temperatures which affects its efficacy and strength. Furthermore, the in vivo resorption rate may not be suitable for all implantation sites, since bone tissue in different parts of the body has different regeneration and remodelling characteristics.

In the present state of art, commercially used bone graft substitutes made exclusively from glasses and glass ceramics utilize glasses with silica as the largest component. However, silica is not a part of the human body and thus the long-term effects of silica accumulation within the body are unknown.

There is a need for a suitable synthetic source of porous, bioactive and biocompatible material for use in tissue implantation techniques. Thus a material that is inherently porous and serves to help the adhesion, growth, regeneration and healing of surrounding and/or missing tissue is of immense significance and may solve a long-standing pressing need.

SUMMARY

This summary is provided to introduce aspects related to development of a porous, bioactive and biocompatible material and process thereof as a substitute to be used in particular for filling of voids, gaps and cavities to ensure adhesion, growth, regeneration and healing of surrounding and/or missing tissue. This summary is however not intended to disclose essential features of the innovation, nor is it intended to determine, limit or restrict the scope of the innovation.

In accordance with one aspect of the present invention, the features of a porous, bioactive and biocompatible material comprising morsels or pellets to be used as tissue graft substitute materials and process thereof, wherein the said composition of morsels or pellets may contain glass and glass ceramic particles exclusively with higher porosity and wherein said material is used preferably in bone graft implantation techniques, are disclosed.

In accordance with one aspect of the present invention, features of a composition for a porous, bioactive and biocompatible material, said composition comprising admixture comprising a mixture of a phosphorous compound, a calcium compound and a sodium compound and at least one other compound being an oxide of an element selected from a group including titanium, boron, potassium, magnesium, strontium, iron, copper, aluminium, zinc, silver, gallium and cobalt such that said material comprises particles having an average particle size in the range of 200 μm to 2500 μm, and with a pore size in the range of 10 μm to 300 μm, are disclosed.

In accordance with one aspect of the present invention, features of a process for preparation of porous, bioactive and biocompatible material, wherein said process may comprise a first step of preparing an admixture comprising a phosphorous compound, a calcium compound and a sodium compound and at least one other compound being an oxide of an element selected from a group including titanium, boron, potassium, magnesium, strontium, iron, copper, aluminium, zinc, silver, gallium and cobalt, wherein said admixture may be melted by heating, is disclosed. The process may comprise a second step of quenching said melted admixture in air or in water for a predetermined time period followed by cooling said admixture to obtain cooled admixture. The process may comprise a third step (103) of crushing and sieving the cooled admixture to obtain a powder comprising particles having a size in the range of 5 μm to 50 μm, The process may further comprise a fourth step (104) of gelation of said powder of third step (103), wherein said gelation may comprise adding to said powder a solvent, a monomer, a cross-linker, a dispersant and a surfactant and mechanically stirring to obtain a foamy liquid, and wherein a polymerization initiator and a catalyst may be added to said foamy liquid with continued mechanical stirring to obtain a gel of said admixture for predetermined time period, and wherein said fourth step (104) further comprises casting said gel in a mould, cutting blocks of the casted gel and drying said blocks. The process may comprise a fifth step (105) of sintering said dried gel blocks of step four by uniformly increasing temperature to reach a first predetermined temperature threshold and further to reach to second predetermined temperature threshold, and further may comprise holding the temperature at said first and second temperature threshold for a predetermined time period followed by cooling down admixture to room temperature. The process may comprise a sixth and final step (106) of crushing followed by sieving said admixture of step five to obtain a porous, bioactive and biocompatible material having a particle size in the range of 200 μm to 2500 μm.

In accordance with one aspect of the present invention, features of a porous, bioactive and biocompatible material, wherein the phosphorous compound is preferably an oxide of phosphorous having a general formula $P_2O_5$ and is added at a molar percentage in the range of 40% to 60%, and wherein the sodium compound is preferably either an oxide of sodium having general formula $Na_2O$ or is a phosphate of sodium having general formula $NaH_2PO_4$ or is a carbonate of sodium having general formula $Na_2CO_3$, and is added at a molar percentage of 1% to 10%, and wherein the calcium compound is preferably either an oxide of calcium having general formula $CaO$ or is a carbonate of calcium having general formula $CaCO_3$, and is added at a molar percentage of 30% to 50%, and wherein the at least one other compound is preferably an oxide of titanium having general formula $TiO_2$, and is added at a molar percentage of 1% to 10%, are disclosed.

In accordance with one aspect of the present invention, features of a porous, bioactive and biocompatible material, wherein the material does not alter the pH of surrounding environment to the detriment of the living tissue, and wherein the material is not harmful for cellular proliferation, and wherein the material comprises particles having a bulk density of approximately 0.487 g/mL, are disclosed.

In accordance with one aspect of the present invention, features of a porous, bioactive and biocompatible material, wherein the material promotes cell adhesion and proliferation on the internal surface of the particles when incubated with MG-63 cells and imaged by confocal laser scanning microscopy, and wherein the material is not cytotoxic to living tissue, are disclosed.

In accordance with one aspect of the present invention, features of a porous, bioactive and biocompatible material comprising morsels or pellets, wherein the resulting composition of morsels or pellets may be prepared by utilising a plurality of polymer based compositions which may include but are not limited to glycerol, polyethylene glycol, poly(lactic acid), polyglycolic acid, collagen, dextran, chitosan, and alginate, to form flowable materials that can be applied easily to the surgical site, are disclosed.

BRIEF DESCRIPTION OF THE DRAWINGS

The detailed description is given with reference to the accompanying figure. In the figure, the left-most digit(s) of a reference number identifies the figure in which the reference number first appears. The same numbers are used throughout the drawings to refer like features and components.

Figure 1:
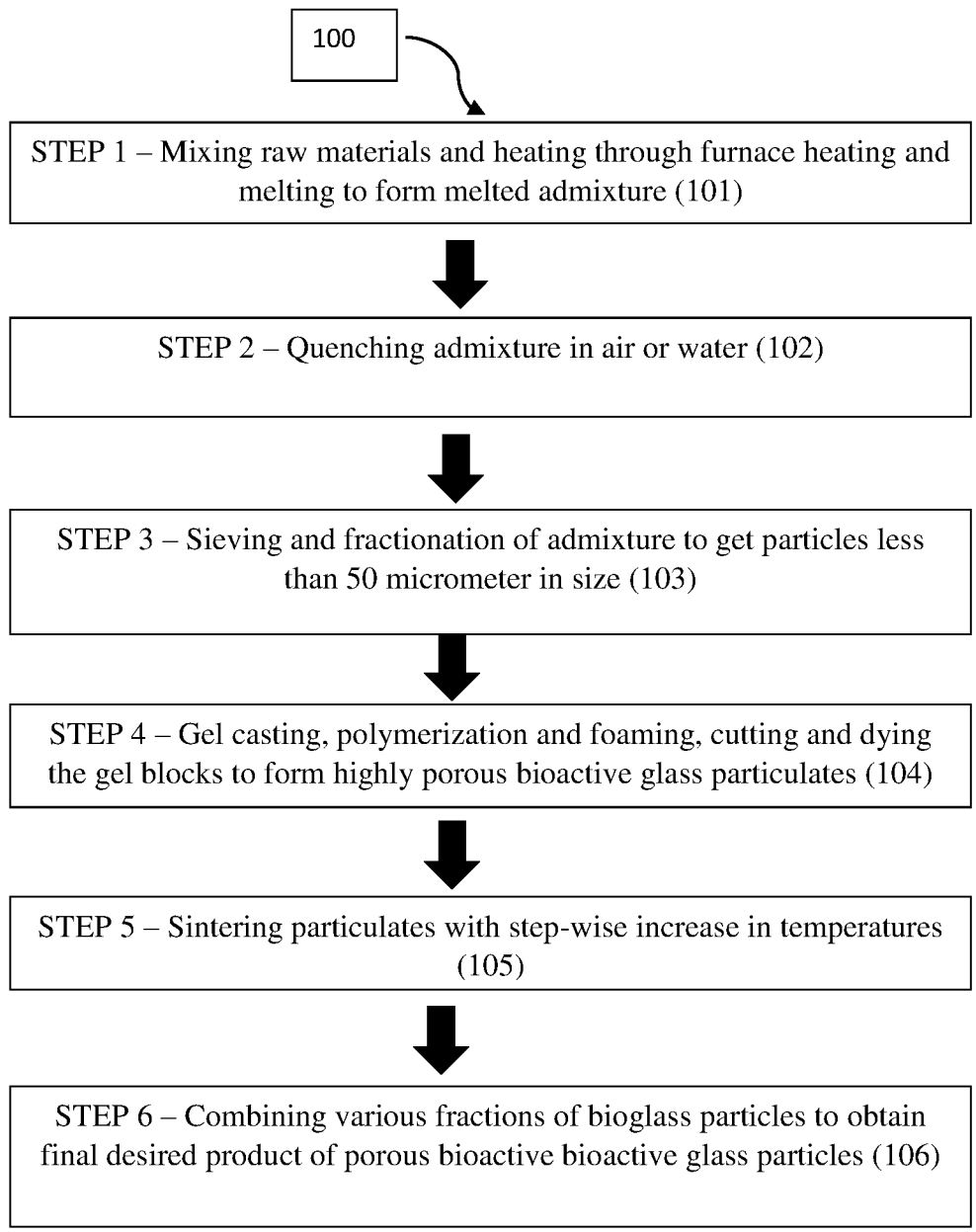
FIG. 1 (100) illustrates an overview of the process for making porous, bioactive and biocompatible material.

The figures depict embodiments of the present disclosure for purposes of illustration only. One skilled in the art will readily recognize from the following description that alternative embodiments of the steps illustrated herein may be employed without departing from the principles of the disclosure described herein.

DETAILED DESCRIPTION

The foregoing detailed description of embodiments is better understood when read in conjunction with the appended drawings. For the purpose of illustrating the disclosure, there are shown in the present document example constructions of the disclosure; however, the disclosure is not limited to the specific design disclosed in the document and the drawings.

The detailed description is provided with reference to the accompanying figures. In the figures, the left-most digit(s) of a reference number identifies the figure in which the reference number first appears. The same numbers are used throughout the drawings to refer like features and components.

Some embodiments of this disclosure, illustrating all its features, will now be discussed in detail. The words "comprising," "having," "containing," and "including," and other forms thereof, are intended to be equivalent in meaning and to be open ended in that an item or items following any one of these words is not meant to be an exhaustive listing of such item or items or meant to be limited to only the listed item or items. It must also be noted that, the singular forms "a," "an," and "the" include plural references unless the context clearly dictates otherwise.

The exemplary embodiments described herein and claimed hereafter may be suitably practiced in the absence of any recited feature, element or step that is, or is not, specifically disclosed herein. For instance, references in this written description to "one embodiment," "an embodiment," "an example embodiment," and the like, indicate that the embodiment described can include a particular feature, structure, or characteristic, but every embodiment may not necessarily include the particular feature, structure, or characteristic. The disclosed embodiments are merely exemplary of various forms or combinations. Moreover, such phrases are not necessarily referring to some embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described. No terminology in this application should be construed as indicating any non-claimed element as essential or critical. The use of any and all examples, or example language (e.g., "such as") provided herein, is intended merely to better illuminate example embodiments and does not pose a limitation on the scope of the claims appended hereto unless otherwise claimed.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller subranges are also included. The upper and lower limits of these smaller ranges are also included therein, subject to any specifically excluded limit in the stated range. For example, a range of "about 0.1% to about 5%" or "about 0.1% to 5%" may be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The present invention is directed to provide a novel porous, bioactive and biocompatible material comprising glass and glass ceramic morsels or pellets and process thereof.

For the purposes of the present invention, the following terms are described hereinunder:

Morsel/Pellet

A Morsel or a Pellet is a small object of regular or irregular shape and effective size in the range of 200 μm to 2500 μm, porous or non-porous structure, with rough or plain surface. It is a type of macroscopic particle, which in turn is a small localized object to which can be ascribed several physical or chemical properties such as volume or mass. In case of porous morsels or pellets, the porous structure is interconnected wherein the pores are connected with each other within the bulk of the object have a pore size in the range of 10 μm to 300 μm.

Porosity

Porosity (also known as void fraction) is a measure of the void (i.e. "empty") spaces in the material and is a fraction of the volume of voids over the total volume, between 0 and 1, or as a percentage between 0% and 100%.

Pore Size

Pore Size is the average of pore diameters of the pores present in the material. The present application contains a disclosure of morsels or pellets having range (10 μm to 300 μm). This size range is important because the cells responsible for bone regeneration in a human body have sizes in the range of 10 μm to 300 μm which is similar to the pore sizes of the morsels. Therefore, the cells can have access to the internal surface area of the morsels for proliferation and differentiation and may contribute to faster bone regeneration.

Biomaterial

A biomaterial is any substance that has been engineered to interact with biological systems for a medical purpose—either a therapeutic (treat, augment, repair or replace a tissue function of the body) or a diagnostic one.

Bioactive Glasses

Bioactive glasses are a group of reactive glass-ceramic biomaterials having bioactivity due to released ions which are responsible for stimulation of surrounding cells and tissue for faster healing.

Bioactivity

Bioactivity of the material is a quality of material whereby it interacts with the surrounding tissue upon implantation within the human body through a time-dependent kinetic modification of the surface—mainly ion exchange reactions between the material and the surrounding body fluids—which is triggered by the implantation.

Biocompatible/Biocompatibility

Biocompatibility is the ability of the material to perform with an appropriate host response in a specific situation, whereby the material performs its desired function with respect to a medical therapy, without eliciting any undesirable local or systemic effects in the recipient or beneficiary of that therapy, but generating the most appropriate beneficial cellular or tissue response in that specific situation, and optimising the clinically relevant performance of that therapy.

X-Ray Diffraction (XRD)

XRD is a technique used for determining the atomic and molecular structure of a crystal in which the crystalline atoms cause a beam of incident X-rays to diffract into many specific directions. By measuring the angles and intensities of these diffracted beams, a three dimensional picture of the density of electrons can be produced within the crystal. From this electron density, the mean positions of the atoms in the crystal can be determined, as well as their chemical bonds, their disorder, and various other information. In the absence of specific orientation of atoms the material is considered as amorphous in nature. θ is the incident angle at which the X-rays strike the crystal or the material. XRD works on the principle of Thomson Scattering equation because of which the incident angle in context of XRD is always mentioned as 2θ. The x-ray response is measured for a 2θ value range of 10° and 60° at each step of 1°.

Negative Control in Cell Culture Experiments

A negative control is a material that is known to have desired effect on the outcome of experiment which in the present invention was non-cytotoxic behaviour shown by the cells. High Density Polyethylene film was used as a negative control.

Positive Control in Cell Culture Experiments

A positive control is a material that is known to have very adverse effect on the outcome of experiment which in present invention was highly cytotoxic behaviour shown by the cells. Organotin stabilized polyurethane film was used as a negative control.

PG

PerioGlas® is a silicate based synthetic bone graft material manufactured and distributed by Novabone.

Sieving

The material in the powder form of particle size below 50 μm or final form of the morsels of size in the range of 200 μm to 2500 μm can be obtained by using sieves. A sieve is a device to obtain particular size or size range, typically using a woven screen such as a mesh or net or metal.

The production process of these morsels or pellets and the unique characteristics attributable to them is based on the material science technology of gel casting followed by foaming, drying and sintering. The particular use of the porous, bioactive and biocompatible morsels or pellets may be as fillers or graft materials in tissue augmentation and regeneration technology. More preferably, the porous, bioactive and biocompatible morsels or pellets may be used as bone graft materials in bone augmentation and regeneration.

Referring now to FIG. 1, the present invention relates to a process for preparation of porous, bioactive and biocompatible material wherein the process may comprise a first step (101) of preparing an admixture comprising predetermined stoichiometric amounts of a phosphorous compound, a calcium compound and a sodium compound and at least one other compound being an oxide of an element selected from a group including titanium, boron, potassium, magnesium, strontium, iron, copper, aluminium, zinc, silver, gallium and cobalt, wherein said admixture is melted by heating. The said process may comprise a second step (102) of quenching said melted admixture in air or in water for a predetermined time period which may be followed by cooling said admixture to obtain cooled admixture. The process may further comprise a third step (103) of crushing and sieving the cooled admixture to obtain a powder comprising particles having a size in the range of 5 μm to 50 μm. The process may further comprise a fourth step (104) of gelation of said powder of third step (103), wherein said gelation may comprise adding to said powder a solvent, predetermined stoichiometric amounts of a monomer, a cross-linker, a dispersant and a surfactant and mechanically stirring to obtain a foamy liquid for a predetermined amount of time, and wherein a polymerization initiator and a catalyst may be added to said foamy liquid with continued mechanical stirring to obtain a gel of said admixture, and wherein said fourth step (104) may further comprise casting said gel in a mould, cutting blocks of the casted gel and drying said blocks. The process may further comprise a fifth step (105) of sintering said dried gel blocks of step four by uniformly increasing temperature to reach a first predetermined temperature threshold and further to reach to a second predetermined temperature threshold, and further may comprise holding the temperature at said first and second temperature thresholds for a predetermined time period followed by cooling down admixture to room temperature. The process may further comprise a sixth step (106) of crushing followed by sieving said admixture of step five to obtain a porous, bioactive and biocompatible material having a particle size in the range of 200 μm to 2500 μm.

Referring still to FIG. 1, in one of the embodiments, the invention relates to porous, bioactive and biocompatible material comprising glass and glass ceramic morsels or pellets and its process for production, wherein the process in a first step (101) may include formation of glass fragments by using raw materials including but not limited of oxides of phosphorous, calcium and sodium as primary components and an additional secondary component selected from a plurality of elements belonging to the alkali metals, alkaline earth metals, transition metals, basic metals, metalloids, and non-metal elemental groups of the periodic table. The primary components of the glass fragments may constitute up to 90 mol % to 99 mol % of the total bioactive glass and glass ceramic composition. The remaining 1 mol % to 10 mol % may belong to any of the plurality of elements belonging to the alkali metals, alkaline earth metals, transition metals, basic metals, metalloids, and non-metal elemental groups of the periodic table. All the major and secondary elements are natural components of the human body unlike inert foreign elements like silicon and therefore their effect on the body can be better predicted.

In another embodiment, the invention relates to a process for production of porous, bioactive and biocompatible material comprising glass and glass ceramic morsels or pellets, wherein the raw materials required to make the glass fragments in the first step (101) may comprise mainly oxides or phosphates or carbonates of phosphorous, sodium, calcium, titanium, magnesium, strontium, iron, copper, aluminium, zinc, silver, gallium, cobalt or any combinations thereof. In any of the embodiments of the present invention, stoichiometric amounts of the required precursors are weighed and then mixed thoroughly.

In another embodiment, the invention relates to a process for production of porous, bioactive and biocompatible material comprising glass and glass ceramic morsels or pellet, wherein the primary and secondary components of the raw materials required to make the glass fragments in the first step (101) may contain 40 mol % to 60 mol % oxides of phosphorous, 30 mol % to 50 mol % oxides or carbonates of calcium, 1 mol % to 10 mol % oxides or phosphates or carbonates of sodium and 1 mol % to 10 mol % oxides of any of the plurality of elements belonging to the alkali metals, alkaline earth metals, transition metals, basic metals, metalloids, and non-metal elemental groups of the periodic table including but not limited to titanium, magnesium, strontium, iron, copper, aluminium, zinc, silver, gallium, cobalt or any combinations thereof.

In an exemplary embodiment, the invention relates to a process for production of porous, bioactive and biocompatible material comprising glass and glass ceramic morsels or pellets, wherein the primary and secondary components of the raw materials required to make the glass fragments in the first step (101) contain 40 mol % to 60 mol % oxides of phosphorous having a general formula $P_2O_5$, 30 mol % to 50 mol % oxides of calcium having general formula CaO or carbonates of calcium having general formula $CaCO_3$, 1 mol % to 10 mol % oxides of sodium having general formula $Na_2O$ or phosphates of sodium having general formula $NaH_2PO_4$ or carbonates of sodium having general formula $Na_2CO_3$ and 1 mol % to 10 mol % oxides of titanium having general formula $TiO_2$.

In one embodiment, the invention relates to a process for production of porous, bioactive and biocompatible material comprising glass and glass ceramic morsels or pellets, wherein the process for formation of the bioactive glass and glass ceramic morsels or pellets in a first step (101) may include mixing the primary components and secondary components in stoichiometric proportions and pouring the said prepared precursor in a crucible followed by placing the crucible in a preheated furnace and subsequently followed by heating the contents to the melting temperature of the precursor mix.

In an exemplary embodiment, the invention relates to a process for production of porous, bioactive and biocompatible material comprising glass and glass ceramic morsels or pellets, wherein the mixing of the primary and secondary components of the glass fragments in a first step (101) may include mixing in Pt/10% Rh type crucible, placing in a furnace preheated to a temperature not less than 700° C. and subsequently heating the precursor mix to a temperature in the range of 1110° C. to 1500° C. for a time period which may not be less than 60 min but which may be increased to up to 5 hours.

In one embodiment, the invention relates to a process for production of porous, bioactive and biocompatible material comprising glass and glass ceramic morsels or pellets, wherein the process for formation of the bioactive glass and glass ceramic morsels or pellets in a second step (102) may include quenching the glass melt in air by pouring on to a steel plate at preferably a temperature close to room temperature followed by crushing in a ball mill and sieving in a sieve shaker to obtain glass particles of desired sizes and may further include a subsequent process for sieving, fractionating and segregating the pieces of glass so obtained.

In another embodiment, the invention relates to a process for production of porous, bioactive and biocompatible material comprising glass and glass ceramic morsels or pellets, wherein the process for formation of the bioactive glass and glass ceramic morsels or pellets in a second step (102) may include quenching the glass melt in water by pouring the glass melt into a metal-container containing water and cooling the said glass melt for at least a time period of 30 min followed by crushing in a ball mill and sieving in a sieve shaker to obtain glass particles of desired sizes and may further include a subsequent process for sieving, fractionating and segregating the pieces of glass so obtained.

In an exemplary embodiment, the invention relates to a process for production of porous, bioactive and biocompatible material comprising glass and glass ceramic morsels or pellets, wherein the glass fragments or pieces or glass frit thus obtained in the second step (102) may be crushed and sieved in a sieve shaker to obtain glass particles with sizes of up to a maximum size of 50 μm size which may be used in the next steps of the process.

In one embodiment, the invention relates to a process for production of porous, bioactive and biocompatible material comprising glass and glass ceramic morsels or pellets, wherein the process for formation of the bioactive glass and glass ceramic morsels or pellets may include in a fourth step (104) gel casting of the glass fragments or particles formed in the second step (102) and sieved in the third step (103) to a maximum size of 50 μm. The said gel casting of glass fragments may include initially mixing the glass fragments vigorously with a solvent, industrially derived monomers with the general formula $C_4H_7NO$, a cross linker, a dispersant and a surfactant to serve as an initial polymerization feed. As a subsequent process, the process may include initiation of polymerization of the polymer through the addition of initiator of polymerization with a general formula $(NH_4)_2S_2O_8$ and a catalyst with a general formula $(CH_3)_2NCH_2CH_2N(CH_3)_2$ preceded and followed by continuous stirring.

In an exemplary embodiment, the invention relates to a process for production of porous, bioactive and biocompatible material comprising glass and glass ceramic morsels or pellets, wherein the process for formation of the bioactive glass and glass ceramic morsels or pellets, in a third step (103) may comprise water as the solvent, 6 g of methacrylamide monomers, 3 g of methylene derivatives of bisacrylamide as crosslinker molecules, 50 μL of Dispex as dispersant molecules and 100 μL of Triton X100 as a surfactant. In a subsequent process in the same step, the invention may relate to the use of ammonium salts of persulfate as polymerization initiator and use of tetramethylene diamine as a catalyst to aid and assist in rapid polymerization of the methcrylamide while being stirred continuously through the use of an overhead mechanical stirrer at 1000 rpm-3000 rpm until gelation occurs. Upon gelation, the solid gel may be cut into smaller pieces or fragments using a cutting tool which may be a knife. The fragments may be further dried at a temperature in the range of 100° C. to 150° C. for a time of at least 10 hours but not exceeding 24 hours to prepare them for the next step.

In one embodiment, the invention relates to a process for production of porous, bioactive and biocompatible material comprising glass and glass ceramic morsels or pellets, wherein the process for formation of the bioactive glass and glass ceramic morsels or pellets, may include the process of sintering in a fifth step (105) at a specified temperature. Initially the sintering is carried out at an initial temperature in the range of 350° C.-450° C. followed by a subsequent heating step at a temperature in the range of 550° C. to 700C.

In an exemplary embodiment. the invention relates to a process for production of porous, bioactive and biocompatible material comprising glass and glass ceramic morsels or pellets, wherein the process for formation of the bioactive glass and glass ceramic morsels or pellets, in a fifth step (105) may include the process of sintering, characterizing in that during said process the temperature may be increased at a uniform rate of at least 1° C./min but not exceeding 5° C./min and wherein both the temperature holdings are carried on for a minimum time period of one hour but not exceeding 3 hours. In a subsequent process, the invention may include allowing the glass fragments sintered in the above manner to cool inside an oven or furnace to a temperature not below room temperature.

In one embodiment, the invention relates to a process for production of porous, bioactive and biocompatible material comprising glass and glass ceramic morsels or pellets, wherein the process for formation of the bioactive glass and glass ceramic morsels or pellets, in a sixth and final step may include crushing and sieving the sintered admixture of the fifth step (105) to make the final product comprising porous, bioactive and biocompatible material having a particle size in the range of 200 μm to 2500 μm.

In one embodiment, the invention relates to a composition for porous, bioactive and biocompatible material comprising glass and glass ceramic morsels or pellets, wherein said composition may comprise an admixture comprising a mixture of a phosphorous compound, a calcium compound and a sodium compound and at least one other compound being an oxide of an element selected from a group including titanium, boron, potassium, magnesium, strontium, iron, copper, aluminium, zinc, silver, gallium and cobalt, characterized in that said material comprises particles having an average particle size in the range of 200 μm to 2500 μm, and having a pore size in the range of 10 μm to 300 μm.

In an exemplary embodiment, the invention relates to a composition for porous, bioactive and wbiocompatible material comprising glass and glass ceramic morsels or pellets, wherein said phosphorous compound may be preferably an oxide of phosphorous having a general formula $P_2O_5$ and may be added at a molar percentage in the range of 40% to 60%, and wherein said sodium compound may preferably be either an oxide of sodium having general formula $Na_2O$ or may be a phosphate of sodium having general formula $NaH_2PO_4$ or may be a carbonate of sodium having general formula $Na_2CO_3$ and may be added at a molar percentage of 1% to 10%, and wherein said calcium compound may preferably be either an oxide of calcium having general formula CaO or is a carbonate of calcium having general formula $CaCO_3$ and is added at a molar percentage of 30% to 50%, and wherein said at least one other compound is preferably an oxide of titanium having general formula $TiO_2$ and is added at a molar percentage of 1% to 10%.

In one embodiment, the invention relates to a composition for porous, bioactive and biocompatible material comprising glass and glass ceramic morsels or pellets, wherein said glass and glass ceramic morsels or pellets may possess the following characteristics in the table 1 below:

TABLE 1

Physical characteristics of the porous, bioactive and biocompatible material comprising glass and glass ceramic morsels or pellets

| Sr. No. | Parameter | Value |
| --- | --- | --- |
| 1. | Surface Area | 0.83 m$^2$/g |
| 2. | Average Pore Size | 10 μm to 300 μm |
| 3. | Particle Size Range | 200 μm to 2500 μm |

In one embodiment, the invention relates to a composition for porous, bioactive and biocompatible material comprising glass and glass ceramic morsels or pellets, wherein said glass and glass ceramic morsels or pellets may be completely amorphous when evaluated using X-Ray Diffraction technology. Under X-RD, for amorphous substance, X-rays will be scattered in many directions leading to a large bump distributed in a wide range (2 Theta) instead of high intensity narrower peaks for crystalline substances.

In an exemplary embodiment, the X-ray diffraction values for porous, bioactive and biocompatible material comprising glass and glass ceramic morsels or pellets are obtained at 2Θ values in the range 10°-60° for a step size of 1°.

In one embodiment, the invention relates to a composition for porous, bioactive and biocompatible material comprising glass and glass ceramic morsels or pellets having a size in the range of 200 μm to 2500 μm and having a pore size in the range of 10 μm to 300 μm, wherein said material may comprise highly interconnected porous structure and may not possess any organic matter and may not show C—H bonding at region of 2900 cm$^{-1}$ when examined using Fourier Transform Infra-Red (FTIR), and wherein the material may have a bulk density of approximately 0.487 g/mL.

In one embodiment, the invention relates to a composition for porous, bioactive and biocompatible material comprising glass and glass ceramic morsels or pellets, wherein said material may not be cytotoxic to living tissue, may not alter the pH of surrounding environment to the detriment of the living tissue i.e. does not adversely alter the pH, and may promote cell adhesion and proliferation on the internal surface of the particles when incubated with MG-63 cells and imaged by confocal laser scanning microscopy. In vitro experiments involving incubation of said material incubation of bone-like cells comprising MG-63 cell-line with said composition under ambient conditions may not hinder cell proliferation of said cells and may show uniform confluency of cells throughout the experimental period when measured at optical density 570 nm on day 1 and day 7 of the incubation.

In one embodiment, the invention relates to a composition for porous, bioactive and biocompatible material comprising glass and glass ceramic morsels or pellets, the material may be resorbable and may result in a loss in weight of particles to an amount of 12 mg to 17 mg when the experiments are conducted in predetermined conditions. The experimental set up may comprise placing said composition in water at 50° C. and further may comprise drying in hot air oven for 24 h at 50° C. and measuring weight of the sample and replacing in said water at 50° C., and wherein said weight loss measurements may be taken for a period of 14 days.

Example 1: Assessing Crystallinity of Porous, Bioactive and Biocompatible Material Before making the morsels, different glass compositions were made. For the biomedical applications, the glass is considered bioactive if it is amorphous in nature. Therefore, the glasses of different compositions were subjected to X-ray Diffraction (XRD) analysis. The phosphate glasses of different compositions were made by the melt-quench procedure as mentioned previously. To determine amorphous or crystalline nature of the original glass, XRD analysis was carried out. The XRD data were collected at 2Θ values in the range 10-60° for a step size of 1°. Exemplary samples were prepared and were assessed for their crystallinity parameters (please see table 1 below). For this, the required amounts of all precursors were weighed and then mixed thoroughly. The precursor mix was then melted in a crucible in the high temperature furnace. Once the melting process was complete, the glass melts were rapidly quenched by pouring on to a steel plate at room temperature. The glass thus produced was further milled in planetary ball mill for 1 h to convert it into powder form.

Figure 2:
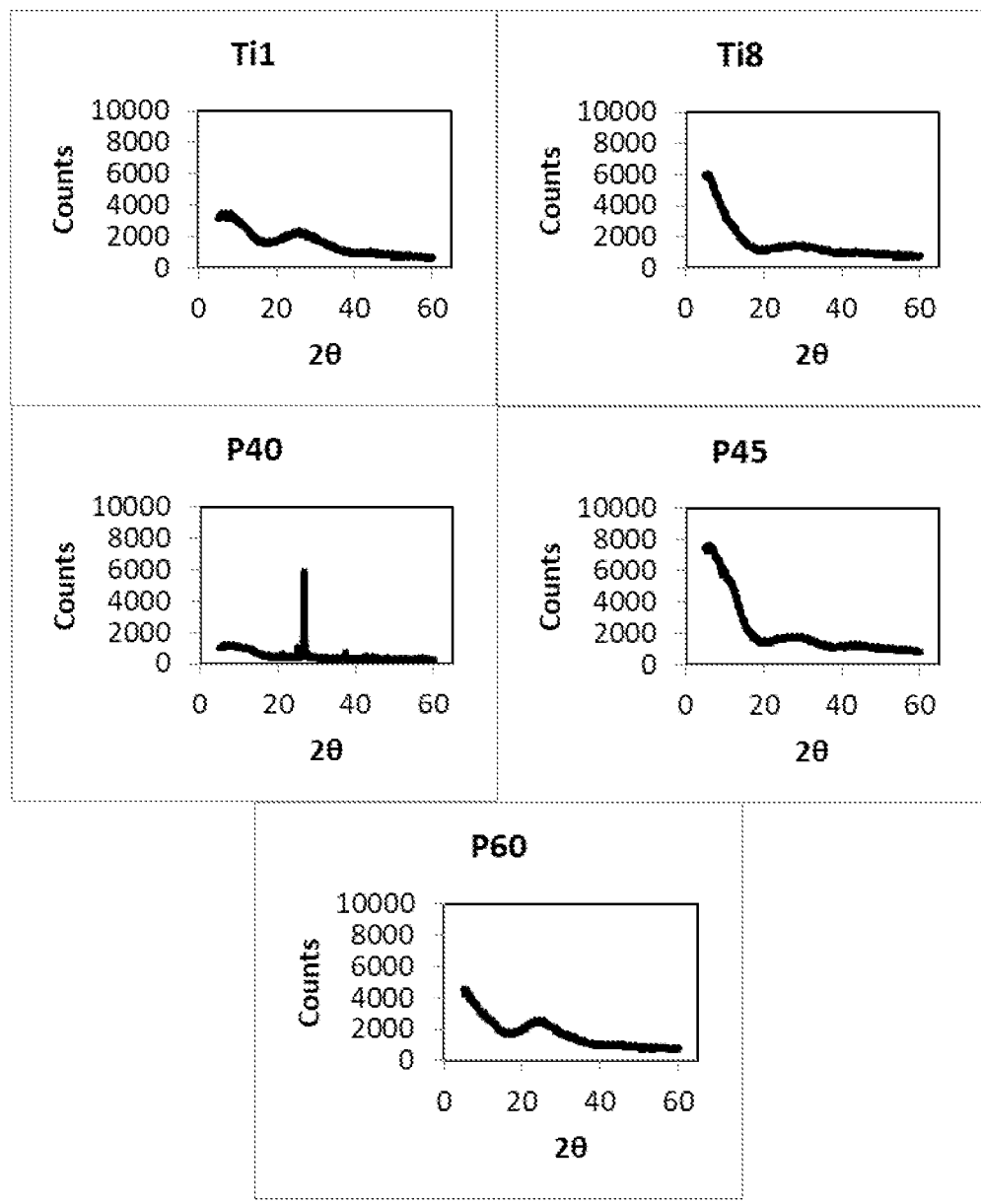
FIG. 2 illustrates X-ray diffraction (XRD) analysis of exemplary samples to confirm amorphous nature of the porous, bioactive and biocompatible material.

Referring to FIG. 2, the figure represents the outcome of the X-ray diffraction experiments with no apparent crystallinity and it was qualitatively observed that the glass morsels are as amorphous as the original glass.

It was observed that all the glass compositions except composition P40 are amorphous and can be bioactive.

TABLE 2

Analysis of crystalline - amorphous nature of different compositions of glass and glass ceramic morsels or pellets

| Sr. No. | Glass Code | Composition | | | | XRD Measured | Observation/ Inference |
| --- | --- | --- | --- | --- | --- | --- | --- |
| | | $P_2O_5$ | CaO | $Na_2O$ | $TiO_2$ | | |
| 1 | Ti1 | 50 | 40 | 9 | 1 | Yes | Amorphous |
| 2 | Ti3 | 50 | 40 | 7 | 3 | No | Amorphous |
| 3 | Ti5 | 50 | 40 | 5 | 5 | Yes | Amorphous |
| 4 | Ti7 | 50 | 40 | 3 | 7 | No | Amorphous |
| 5 | Ti8 | 50 | 40 | 2 | 8 | Yes | Amorphous |
| 6 | P60 | 60 | 30 | 5 | 5 | Yes | Amorphous |
| 7 | P45 | 45 | 45 | 5 | 5 | Yes | Amorphous |
| 8 | P40 | 40 | 50 | 5 | 5 | Yes | Crystalline |

Example 2: Analysis of In Vitro Proliferation of Bone-Like Cells in Presence of Morsels of the Present Invention The first step in determining the potential of a material as a bone graft material is to evaluate proliferation of bone-like cells in presence of the proposed bone graft material. Therefore, in vitro MG-63 cells' (bone-like cells) proliferation study was carried out in presence of morsels made from the glass compositions made (please check the XRD analysis section).

Glass Making—The glass samples of different compositions were made as explained in the XRD analysis section. The details of the glass compositions are as follows in Table 3:

TABLE 3

Composition of different porous, bioactive and biocompatible material comprising glass and glass ceramic morsels or pellets

| Glass | Composition | | | |
|---|---|---|---|---|
| | $P_2O_5$ | CaO | $Na_2O$ | $TiO_2$ |
| Ti1 | 50 | 40 | 9 | 1 |
| Ti3 | 50 | 40 | 7 | 3 |
| Ti5 | 50 | 40 | 5 | 5 |
| Ti7 | 50 | 40 | 3 | 7 |
| Ti8 | 50 | 40 | 2 | 8 |
| P60 | 60 | 30 | 5 | 5 |
| P45 | 45 | 45 | 5 | 5 |

Glass Morsel Making—Glass (Check XRD Analysis Section) powder (20 g); water (18 mL); methacrylamide (monomer, 6 g); N N' methylene bisacrylamide (cross-linker, 3 g); dispersant (2 drops) and surfactant (0.1 mL) were mixed vigorously using the overhead mechanical stirrer. A foamy liquid was formed to which ammonium persulfate (polymerization initiator, 1 g) and tetramethylene diamine (Catalyst, 4 mL) was added and stirred thoroughly before gelling. The foam was then cut into smaller blocks which are then dried at 125° C. for 24 h and then ramped at 2° C./min to 350° C., held for 1 h and ramped up again at 2° C./min to 700° C. and held for 1 h before furnace cooling. The foam thus formed was further milled and sieved to achieve morsels of size in the range of 400 to 800 μm mesh.

Cell Culture—The morsel samples were heat sterilized (180° C., 3 h in hot air oven). Polystyrene 24 well non-treated cell culture plates were used as control. Each well of Low attachment 24 well tissue culture suspension plates received 200 mg of test sample (in triplicate). Each well (Test and Control) received $5 \times 10^4$ MG-63 cells via 1 mL medium. Plates were incubated at 37° C. with 5% $CO_2$ and >90% humidity. MTT assay was carried out at day 1 and day 7.

Figure 3:
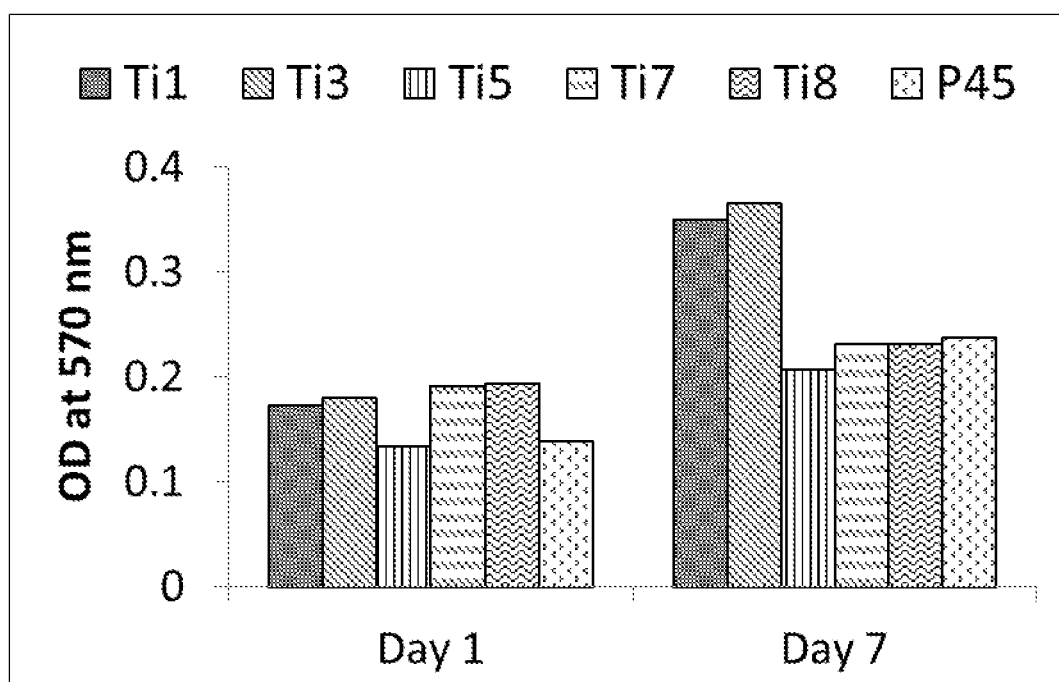
FIG. 3 illustrates in vitro cell proliferation analysis for porous, bioactive and biocompatible material

Referring to FIG. 3, what is shown are the results of in vitro cell proliferation analysis. As can be observed, the cells did not survive in presence of P60 morsels. On Day 1, no significant difference in the number of cells was observed in presence of morsels made from glass of different compositions as represented by the OD measured at 570 nm. On Day 7, no significant difference in the number of cells was observed in presence of morsels made from glass of different compositions and unhindered (bone-like) MG-63 proliferation was observed for Ti1, Ti3, Ti5, Ti7, Ti8, P45. It was further observed that Ti1, Ti3 do not have uniform colour and that Ti7, Ti8 and P45 require higher temperature for glass melting. Consequently, it was observed that Ti5 was the best possible composition for ease of making the product in terms of low temperature and uniform colour.

Example 3: Analysis of Confocal Microscopy of MG-63 Cells Proliferated on Morsels of the Present Invention Confocal laser scanning microscopy (CLSM), or in other words confocal microscopy, is one of the most commonly conducted imaging studies to gain a qualitative or visual understanding of the 3D interaction between a biomaterial and cells or tissues. In conventional CLSM studies, the cells are cultured on the biomaterial over a certain period comprising one or more experimental time point(s); at each time point, the cells are treated with a dye that preferentially stains a particular cell organelle (say the nucleus or the cytoskeleton) and are then viewed under the confocal microscope. When multiple two-dimensional images at different depths in the sample are captured, three-dimensional structures (a process known as optical sectioning) can be reconstructed, which provides information regarding aspects such as cell viability, adhesion, signalling and proliferation. Importantly, in the case of morsels of the present invention, which have an interconnected 3D porous structure, CLSM provides information regarding the depth of penetration of the cells within the morsel itself.

Initially, Ti5 glass was made as explained in the XRD analysis section above in example 1 and further glass morsels were made as explained in the in vitro proliferation study in example 2. Cell culture experiments were set up and cell culture protocol used was similar to that used for the proliferation study explained in example 2. At each time point (Day 2, Day 6 and Day 10, each well of the control (in the present case, tissue culture plastic or TCP) and test samples was rinsed with phosphate buffered saline (PBS). To each well, 100 μl of a staining mix made up of 2 μl/ml acredine orange (AC) and 1 μl/ml propidium iodide (PI) was added to each well (AC stains the live cells, while PI stains dead cells). The plates were incubated at room temperature for max. 30 minutes after wrapping in aluminium foil. Then, imaging was carried out using a Leica SP8 Spectral Confocal Laser Scanning Microscope at excitation wavelengths of 488 nm for AC (green) and 561 nm for PI (red).

Figure 4:
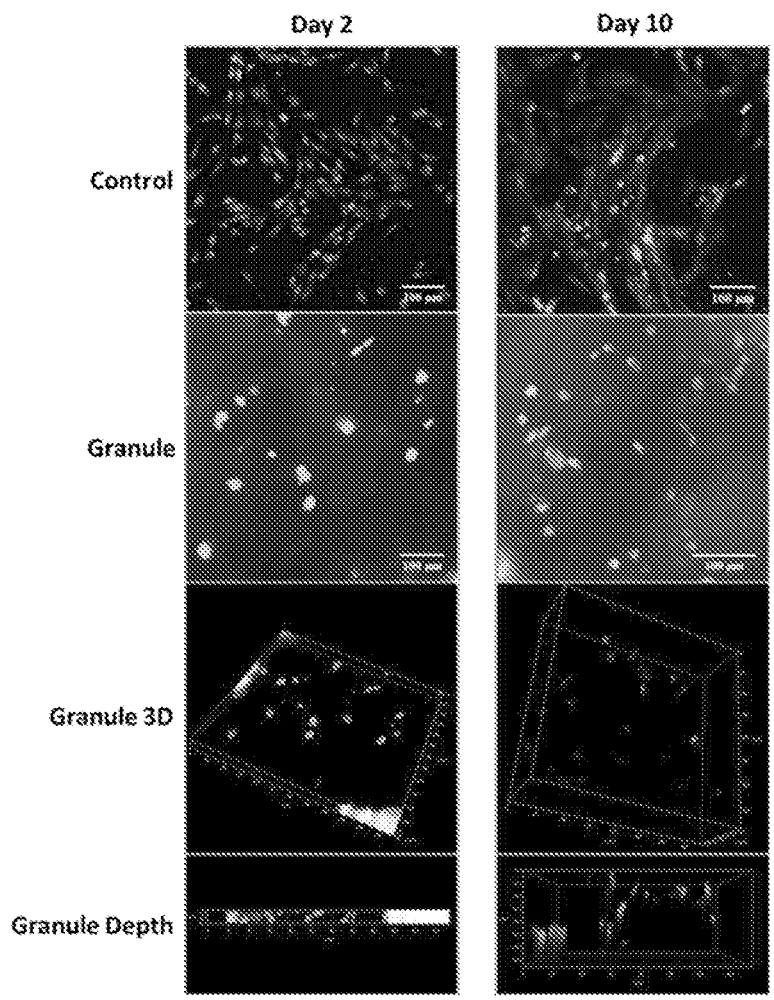
FIG. 4 illustrates confocal laser scanning microscopy of cell proliferation analysis.

Referring to FIG. 4, the CLSM images obtained for the control and morsels of the present invention samples at time points of 2 days and 10 days are shown. The "Granule" images reveal an increase in number of viable cells adhering to the morsels of the present invention from day 2 to day 10. The "Granule 3D" images show that on both day 2 and day 10, cells have penetrated into granule structure through the interconnected pores, with greater penetration depth on day 10 as compared to day 2; this indicates that the pore size of morsels of the present invention is suitable for the penetration of cells into the porous structure. The "Granule Depth" more clearly confirms the penetration of cells into the porous structure over a 10-day period, with the maximum penetration depth increasing from approx. 30 microns at day 2 to approx. 130 microns at day 10. The cells at day 2 are more circular in nature; the cells at day 10 are more elongated in nature.

Referring still to FIG. 4, it was concluded that the bone-like MG-63 cells were viable on the surface of morsels of the present invention as well as in its bulk due to the interconnected porous structure.

Example 4: Scanning Electron Microscopy of Morsels of the Present Invention

The surface of a biomaterial is important as it determines whether the osteogenic cells are attracted to initiate the process of bone regeneration. The surface needs to be rough and porous as such surfaces are known to attract and proliferate osteogenic cells better as compared to smooth surfaces. This was evaluated using Scanning Electron Microscopy (SEM) analysis. Briefly, the glass morsels prepared as explained previously were observed using SEM.

The images were taken at different magnifications to understand the topography of the surface.

Figure 5A:
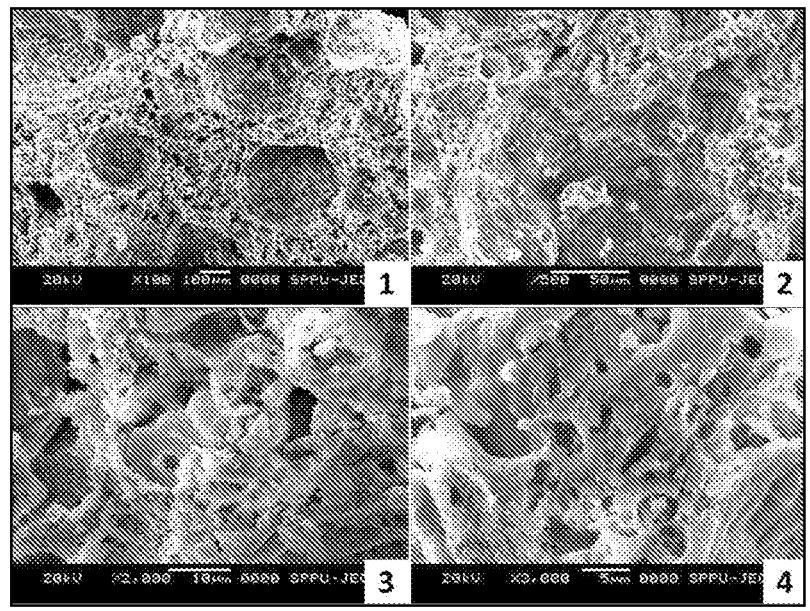
FIG. 5 illustrates Scanning Electron Microscope (SEM) images of the product at to illustrate pore structure of porous, bioactive and biocompatible material.

Referring to FIG. 5A, it was observed that the surface of the morsel was characterized by open holes with size in the range of 100-300 μm and also has smaller holes in the range of 10 to 50 μm i.e. established that the surface is very porous in nature and suitable for cell proliferation.

Further, it is known in prior art that for bone graft applications in dentistry, the morsel size should be in the range of 200 to 800 μm. There are commercially available synthetic as well as non-synthetic (xenograft) bone graft materials of the above-mentioned size range particles. One of the primary advantages of the present invention is the porosity of the morsels. Therefore, it was deemed necessary to find out whether the morsels are still porous with average particle size in the range of 200-800 μm. Therefore, the morsels in these size ranges specifically were observed by SEM.

Figure 5B:
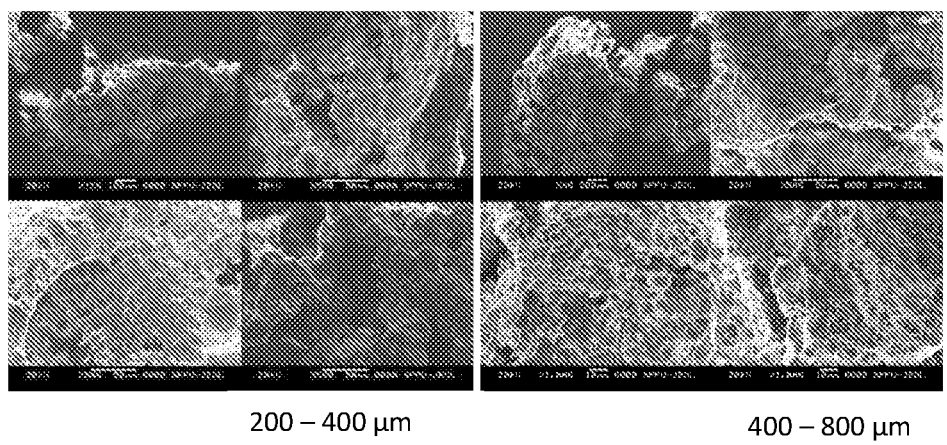

Referring now to FIG. 5B, two fractions of morsels were isolated with particle size in the range of 200-400 μm and 400-800 μm. From the images, it is clear that the surface is very porous in nature and suitable for cell proliferation and that the porous nature of the morsels is not destroyed due to processing of the morsels to reduce size in the range of 200-800 μm.

Example 5: FTIR of Morsels of the Present Invention Before and after Sintering to Determine Calcination Efficiency of Sintering During the procedure of glass morsels sintering, it is necessary to remove the organic matter of the polymer and other organic ingredients used during the making of the morsels. In order to confirm the absence of any organic matter, Fourier Transform Infra-Red (FTIR) spectroscopy was employed. FTIR spectra of glass sample before and after sintering were determined. To determine the data for glass samples after sintering crystallization, the morsels were crushed to powder form. Exemplary samples were prepared and were assessed for percentage of organic matter within the bioactive glass and glass ceramic morsels or pellets.

Figure 6:
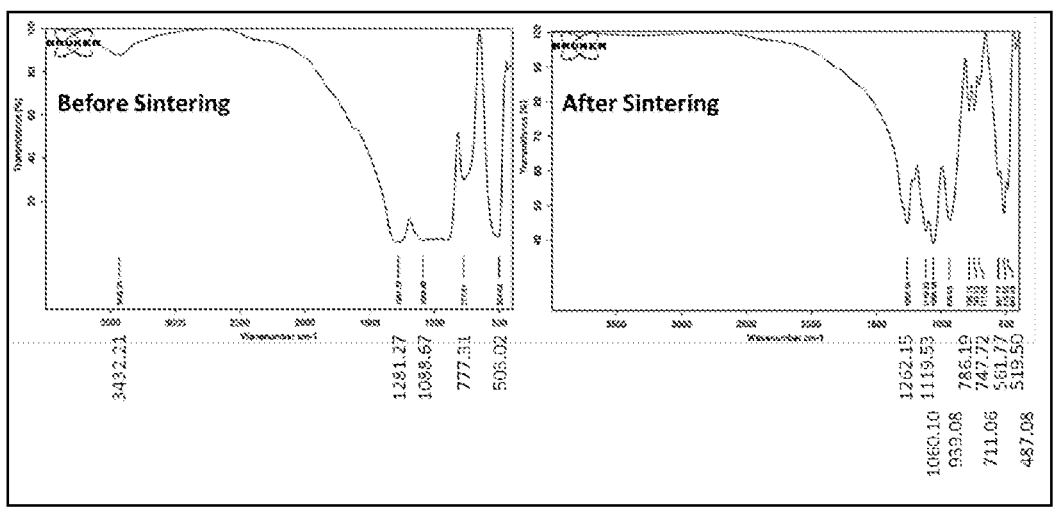
FIG. 6 illustrates Fourier Transform InfraRed (FTIR) spectroscopy analysis of glass before and after sintering

Referring now to FIG. 6, the figure represents the outcome of the experiments with the analysis confirming 0% organic matter i.e. the removal of the organic phase completely in the sintered glass since there is no peak corresponding to C—H bond (region of 2900 cm−1) in the glass after sintering. This observation indicates no presence of organic matter in the sintered glass sample.

Example 6: In Vitro Degradation of Morsels of the Present Invention

The glass used for making the morsels is biodegradable. In the physiological environment, such degradation causes release in ions which accelerates the process of bone healing. The release of these ions also affects the pH of the environment. Drastic changes in pH conditions may be harmful for the bone healing process and may hinder the process of bone regeneration. Weight loss was monitored for 14 days at regular intervals to study degradation of the morsels. pH change was monitored over the same time period of 14 days to evaluate any primary shift in the pH from the natural condition. Finally, the released amount of different ions was measured to understand the ion release profile of the glass components.

Briefly, the glass morsels were prepared as explained previously. The morsels were kept in plastic containers (in triplicate) with 10 mL milli-Q water at 50° C. A separate container was used for each measurement and time point. For the weight loss study, at each time point, morsel samples were removed from the container and dried in hot air oven for 24 h at 50° C. After 24 h the sample weight was measured. At each time point the water in the container, after removing the morsels, was stored for elemental analysis to determine the release of ions. For the pH change study, 3 containers with water were evaluated for the study period as control. pH of both the control as well as the test sample (after removing the morsels) was measured at each time point. The amount of ions released was determined by Optical Emission Spectroscopy (OES).

Figure 7A:
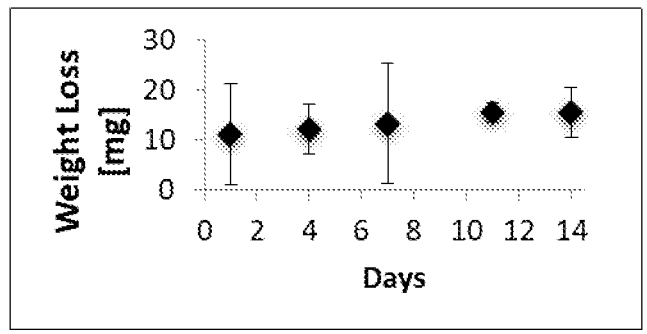
FIG. 7 illustrates in vitro degradation, pH change and ion release of porous, bioactive and biocompatible material.

Referring now to FIG. 7A, the average weight loss was 15 mg over the period of 14 days (approximately 8%). Such weight loss may be accelerated in the physiological environment such as in the case of implanted bone graft material. Such enhanced weight loss in the physiological environment is due to presence of physiological fluids such as saliva, blood etc. and the micro-organisms present.

Figure 7B:
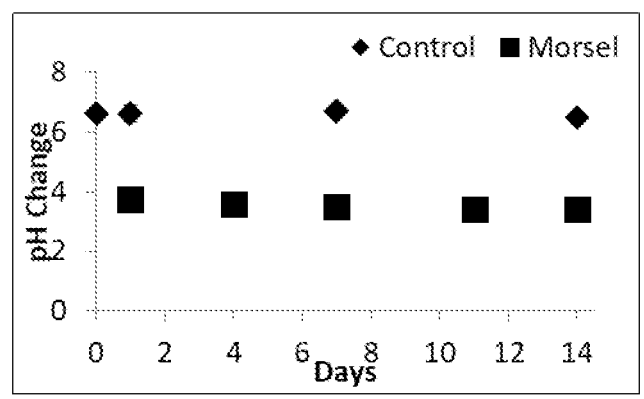

Referring now to FIG. 7B, the pH of the solution in which morsels were incubated remained almost constant at 4.5 after day 1 which is not a harmful environment for proliferation and differentiation of the cells. It (pH) does not hinder the healing or bone regeneration process for the application of bone graft materials.

Figure 7C:
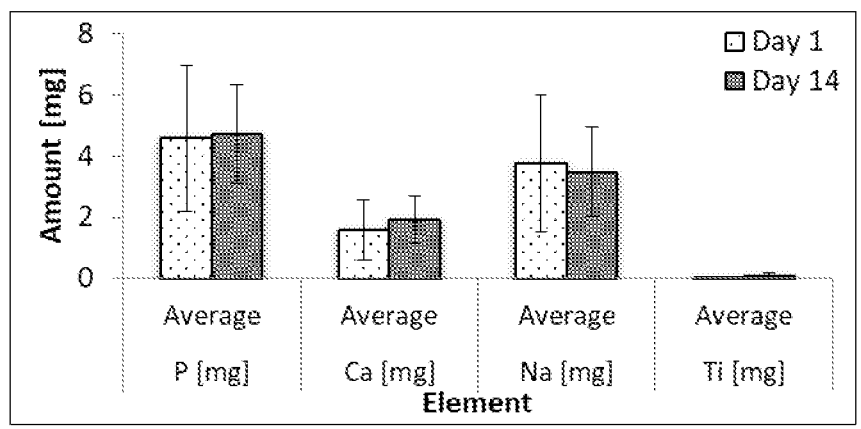

Referring now to FIG. 7C, the amount of ions released after day 1 remained similar in amount after 14 days. This may be due to the static nature of the experiment where the same water remained in contact with the morsels. The release of Calcium (Ca) and Phosphate (P) ions was observed as a good trend because it is known from the literature that the release of these ions forms an apatite like structure which further supports bone formation.

Based on the experiments, it was concluded that the weight loss shows degradation of the sintered morsels and that the pH change may not have any adverse effect on the progenitor cells during healing of the grafted site and also that release of P and Ca ions at the start of the experiment may have desirable effect on recruitment, proliferation and differentiation of the progenitor cells during the healing process.

Example 7: Bulk Density of Morsels of the Present Invention

Bulk density of a bone graft material, especially a porous one, is important. A high bulk density reflects less or no porosity while low density suggests high pore volume and accessible surface area. The bulk density comparison of the morsels with the unprocessed glass gives an indication regarding the porous nature of the former material.

Briefly, the glass morsels were prepared as explained previously. Bulk density of the sample was measured and for comparison, bulk density of a commercially available synthetic bone graft material is also measured. It was seen that the morsels of the present invention have lower bulk density as compared to the original glass and the commercially available synthetic bone graft material. The results have been enumerated in Table 4 below:

TABLE 4

Bulk density comparisons between morsels of the present invention, glass and ccommercially available synthetic bone graft material

| Sample | Bulk Density [g/mL] |
|---|---|
| PG* | 1.442 |
| Glass | 1.379 |
| Morsels of present invention | 0.487 |

*Commercially available synthetic bone graft material

Example 8: In Vitro Cytotoxicity (Direct Contact) Test of Morsels of the Present Invention Cytotoxicity is the quality of the material being toxic to cells. This is the first step to determine the biocompatibility of the material. This test determines whether the cells survive and proliferate in presence of the proposed material of the present invention. Briefly, L929 mammalian fibroblast cells were grown in 96 well plates. After verifying sub confluency (80%), previously sterilized samples (heat sterilized) and controls were carefully placed on the cell layer in the centre of each of the triplicate wells. After 24 h (incubation at 37 C with 5% $CO_2$ and >90% humidity), plates were examined under phase contrast microscope for assessing changes in general morphology, vacuolization, detachment, cell lysis and membrane integrity. After microscopic examination, negative and positive controls were carefully removed from the plate. Test material could not be removed because of its particulate nature. 20 μl of the MTS activated reagent solution was added to each well. The plate was swirled to mix the dye and incubated in dark for 3 h at 37 degrees Celsius. Absorbance was measured at 490 nm and results obtained have been shown in Table 5 below:

TABLE 5A

Quantitative measurements of cytotoxic effects by MTT assay
Quantitative measurements of cytotoxic effects by MTT assay

| Material | Viability [%] |
|---|---|
| PG* | 100 |
| Morsels of present invention | 100 |
| Negative Control | 100 |
| Positive Control | 32.3 |

*Commercially available synthetic bone graft

TABLE 5B reactivity grades for cytotoxicity
Reactivity Grades

| Material | Reactivity Grades |
|---|---|
| PG* | 0 |
| Morsels of Present Invention | 0 |
| Negative Control | 0 |
| Positive Control | 4 |

Description of Reactivity Zone
0 = No Reactivity — No detectable zone around or under the specimen
1 = Slight Reactivity — Some malformed or degenerated cells under specimen
2 = Mild Reactivity — Zone limited to area under specimen
3 = Moderate Reactivity — Zone extending specimen size up to 1 cm
4 = Severe Reactivity — Zone extending farther then 1 cm beyond specimen
*Commercially available synthetic bone graft In one embodiment, the invention relates to a composition for porous, bioactive and biocompatible material comprising glass and glass ceramic morsels or pellets, wherein the particulates may be utilised in any physical form for clinical applications on humans and animals and may include mixing the porous bioactive glass particulates with polymer materials including, but not limited to, glycerol, polyethylene glycol, poly(lactic acid), polyglycolic acid, collagen, dextran, chitosan, and alginate, to form flowable materials that can be applied easily to the surgical site.

In one embodiment, the invention relates to a composition for porous, bioactive and biocompatible material comprising glass and glass ceramic morsels or pellets, wherein the bioactive glass and glass ceramic morsels or pellets do not contain any artificial porosity formation agents like collagen, PLLA etc. which impart porosity only in composite form and not to the glass morsels or pellets itself.

In one embodiment, the invention relates to a composition for porous, bioactive and biocompatible material comprising glass and glass ceramic morsels or pellets, wherein the bioactive glass and glass ceramic morsels or pellets may comprise a scaffold which not only provides a three-dimensional (3D) structure for the regeneration of natural tissue, but also degrades gradually and, eventually be replaced by the natural bone tissue completely. The estimated bone regeneration time for the bone graft may be in the range of 1 month to 6 months.

In one embodiment, the invention relates to a composition for porous, bioactive and biocompatible material comprising glass and glass ceramic morsels or pellets, wherein the bioactive glass and glass ceramic morsels or pellets may allow faster or slower degradation of the bulk material as well as faster or slower release i.e. may facilitate controlled release of a particular primary or secondary component of the mixture.

In another embodiment, the invention relates to a composition for porous, bioactive and biocompatible material comprising glass and glass ceramic morsels or pellets, wherein the bioactive glass and glass ceramic morsels or pellets may permit avoidance of crystallization in case of sintered products and thus can help in uniform application of the invention since the glass morsels or pellets remain amorphous which is more bioactive than the crystallized glass.

In yet another embodiment, the invention relates to a composition for porous, bioactive and biocompatible material comprising glass and glass ceramic morsels or pellets, wherein the bioactive glass and glass ceramic morsels or pellets may provide antimicrobial properties through release of antimicrobial ions forming part of the composition of the morsels or pellets which may include but are not limited to ions of copper, gallium, silver or any combinations thereof.

In yet another embodiment, the invention relates to a composition for porous, bioactive and biocompatible material comprising glass and glass ceramic morsels or pellets, wherein the bioactive glass and glass ceramic morsels or pellets may provide angiogenic properties through release of ions inducing angiogenesis forming part of the composition of the morsels or pellets and which may include cobalt.

The foregoing description shall be interpreted as illustrative and not in any limiting sense. A person of ordinary skill in the art would understand that certain modifications could come within the scope of this disclosure.

We claim:

1. A process for preparation of porous, bioactive and biocompatible material having a particle size in the range of 200 μm to 2500 μm, said process comprising;
   a. melting an admixture comprising a phosphorous compound in an amount of 40 mol % to 60 mol %, a calcium compound in an amount of 30 mol % to 50 mol %, a sodium compound, and at least one other compound,
      said at least one other compound being an oxide of an element selected from the group consisting of titanium, boron, potassium, magnesium, strontium, iron, copper, aluminum, zinc, silver, gallium and cobalt, wherein the admixture is free of silicon;
   b. quenching said melted admixture in air or in water, followed by cooling said admixture to obtain a cooled admixture,
   c. crushing and sieving the cooled admixture to obtain a powder comprising particles having a size in the range of 5 μm to 50 μm,
   d. converting said powder into a gel, and casting said gel in a mold, cutting blocks of the cast gel and drying said gel blocks,
   e. sintering said dried gel blocks by:
      uniformly increasing a temperature at a uniform rate to reach a first temperature threshold;
      holding the temperature at said first temperature threshold:
      uniformly increasing said temperature at said uniform rate to reach a second temperature threshold:
      holding the temperature at said second temperature threshold; followed by
      cooling the gel blocks to room temperature; and
   f. crushing and sieving said sintered gel blocks to obtain the porous, bioactive and biocompatible material having a particle size in the range of 200 μm to 2500 μm and a bulk density in the range of 0.3 g/mL to 0.6 g/mL.

2. The process of claim 1, wherein said phosphorous compound is an oxide of phosphorous having a formula $P_2O_5$.

3. The process of claim 1, wherein said sodium compound is an oxide of sodium having formula $Na_2O$, a phosphate of sodium having formula $NaH_2PO_4$, or a carbonate of sodium having formula $Na_2CO_3$.

4. The process of claim 1, wherein said calcium compound is an oxide of calcium having formula CaO or a carbonate of calcium having formula $CaCO_3$.

5. The process of claim 1, wherein said at least one other compound is an oxide of titanium having formula $TiO_2$.

6. The process of claim 1, wherein said melting of the admixture is carried out by heating to a temperature in the range of 1100 degrees Celsius to 1500 degrees Celsius, for a time period in the range of 60 minutes to 300 minutes.

7. The process of claim 1, wherein said quenching of said melted admixture is carried out by pouring the melted admixture on to a steel plate at room temperature, or by pouring the melted admixture into a container containing water, and wherein said cooling is carried out for a time of up to 30 minutes.

8. The process of claim 1, wherein sintering said dried gel blocks removes all organic matter, so that said porous, bioactive and biocompatible material does not contain any residual organic content.

9. The process of claim 1, wherein:
   said sodium compound is added at a molar percentage of 1% to 10%; and
   said at least one other compound is added at a molar percentage of 1% to 10%.

10. The process of claim 1, wherein converting said powder into a gel comprises:
    adding to said powder a solvent, a monomer, a cross-linker, a dispersant and a surfactant and mechanically stirring to obtain a foamy liquid,
    adding a polymerization initiator and a catalyst to said foamy liquid with continued mechanical stirring to obtain a gel.

11. The process of claim 10, wherein:
    the solvent is water, the monomer is methacrylamide, the cross-linker is a bisacrylamide monomer, the dispersant is an ammonium polyacrylate polymer, and the surfactant is a polyoxyethylene alkylphenyl ether, and
    the mechanical stirring is carried out at 2000 rpm.

12. The process of claim 10, wherein:
    the polymerization initiator is an ammonium persulfate salt and the catalyst is tetramethylene diamine, and
    drying the gel blocks comprises heating the gel blocks to a temperature in the range of 100° C. to 150° C. for between 10 hours and 24 hours.

13. The process of claim 1, wherein:
    said uniform rate of increasing temperature is between 1° C/min and 5° C/min,
    said first temperature threshold is a temperature in the range of 350° C. to 450° C.,
    said second temperature threshold is a temperature in the range of 550° C. to 700° C.,
    said temperature is held at said first temperature threshold for between 1 hour and 3 hours: and
    said temperature is held at said second temperature threshold for between 1 hour and 3 hours.

14. The process of claim 13, wherein said second temperature threshold is 625° C.

15. The process of claim 1, wherein said at least one other compound is an oxide of an element selected from the group consisting of boron, potassium, magnesium, strontium, iron, copper, aluminum, zinc, silver, gallium and cobalt.

* * * * *